US009204400B2

(12) United States Patent
Xiao et al.

(10) Patent No.: US 9,204,400 B2
(45) Date of Patent: Dec. 1, 2015

(54) METHOD AND DEVICE FOR RESOURCE CONFIGURATION

(75) Inventors: Weimin Xiao, Hoffman Estates, IL (US); Bingyu Qu, Rolling Meadows, IL (US); Shulan Feng, Beijing (CN); Fredrik Berggren, Kista (SE); Brian K. Classon, Palatine, IL (US)

(73) Assignee: Huawei Technologies Co., Ltd., Shenzhen (CN)

( * ) Notice: Subject to any disclaimer, the term of this patent is extended or adjusted under 35 U.S.C. 154(b) by 535 days.

(21) Appl. No.: 13/464,474

(22) Filed: May 4, 2012

(65) Prior Publication Data

US 2012/0238310 A1 Sep. 20, 2012

Related U.S. Application Data

(63) Continuation of application No. PCT/CN2009/075012, filed on Nov. 18, 2009.

(30) Foreign Application Priority Data

Nov. 6, 2009 (WO) .................. PCT/CN2009/074830

(51) Int. Cl.
*H04B 7/00* (2006.01)
*H04W 52/24* (2009.01)

(52) U.S. Cl.
CPC ...................................... *H04W 52/24* (2013.01)

(58) Field of Classification Search
CPC ....... H04W 52/24; H04W 52/50; H04L 47/10
USPC .......................................... 455/522; 370/230
See application file for complete search history.

(56) References Cited

U.S. PATENT DOCUMENTS 7,193,978 B2 * 3/2007 Ishikawa ................. H04J 13/16
370/320
7,293,090 B1 * 11/2007 Saleh .................. H04L 43/0817
370/412

(Continued)

FOREIGN PATENT DOCUMENTS

CN       1515103 A       7/2004
CN     101345983 A       1/2009

(Continued)

OTHER PUBLICATIONS

1st Office Action in corresponding Chinese Patent Application No. 200980147218.7 (Jan. 30, 2012).

(Continued)

*Primary Examiner* — Hai V Nguyen
(74) *Attorney, Agent, or Firm* — Leydig, Voit & Mayer, Ltd.

(57) ABSTRACT

The embodiments of the present invention disclose a method and a device for resource configuration. The method includes: determining an extra resource block existing in a wireless resource, where the extra resource block is a resource that cannot be identified by a long term evolution system; configuring transmission power of a resource element in the extra resource block according to a power configuration rule; and sending a signal on the resource element in the extra resource block according to configured transmission power. With the preceding technical solution, an extra resource block can be used for transmitting a signal, so that a resource utilization rate may be improved.

12 Claims, 4 Drawing Sheets

(56) References Cited

U.S. PATENT DOCUMENTS

| | | | | |
|---|---|---|---|---|
| 7,869,415 B2* | 1/2011 | Lee | H04L 5/0007 | 370/344 |
| 8,041,967 B2* | 10/2011 | Belady | G06F 1/3203 | 713/320 |
| 8,050,202 B2* | 11/2011 | Ishii | H04L 1/1854 | 370/282 |
| 8,059,611 B2* | 11/2011 | Ishii | H04J 11/00 | 370/208 |
| 8,160,862 B1* | 4/2012 | Poplack | G06F 1/3206 | 703/18 |
| 8,233,458 B2* | 7/2012 | Ahn | H04W 52/54 | 370/335 |
| 8,286,165 B2* | 10/2012 | Miyata | G06F 1/32 | 709/221 |
| 8,315,661 B2* | 11/2012 | Zong | H04W 52/16 | 455/226.1 |
| 8,325,661 B2* | 12/2012 | Montojo | H04W 72/042 | 370/329 |
| 8,326,341 B2* | 12/2012 | Hugi | H04L 5/0023 | 455/422.1 |
| 8,369,450 B2* | 2/2013 | Khan | H04L 5/0023 | 375/299 |
| 8,369,884 B2* | 2/2013 | Ishii | H04L 5/0075 | 370/318 |
| 8,406,182 B2* | 3/2013 | Tiirola | H04W 72/04 | 370/329 |
| 8,428,066 B2* | 4/2013 | Guo | H04L 5/0007 | 370/395.2 |
| 8,446,849 B2* | 5/2013 | Damnjanovic | H04W 52/34 | 370/311 |
| 8,488,714 B2* | 7/2013 | Wu | H04L 5/0044 | 375/259 |
| 8,532,017 B2* | 9/2013 | Ojala | H04W 52/146 | 370/318 |
| 8,543,149 B2* | 9/2013 | Pi | H04L 5/0053 | 370/310 |
| 8,553,594 B2* | 10/2013 | Baum | H04L 5/0007 | 370/310 |
| 8,565,177 B2* | 10/2013 | Ball | H04L 5/0007 | 370/329 |
| 8,737,997 B2* | 5/2014 | Xiong | H04W 48/16 | 455/435.2 |
| 8,767,638 B2* | 7/2014 | Wu | H04L 5/001 | 370/329 |
| 8,774,819 B2* | 7/2014 | Zhang | H04W 52/146 | 455/522 |
| 8,818,442 B2* | 8/2014 | Seo | H04W 52/146 | 455/522 |
| 8,830,855 B2* | 9/2014 | Kim | H04W 28/18 | 370/252 |
| 8,848,729 B2* | 9/2014 | Chen | H04L 5/001 | 370/329 |
| 2003/0072297 A1* | 4/2003 | Oses | H04B 7/26 | 370/349 |
| 2004/0156448 A1 | 8/2004 | Sahlin et al. | | |
| 2004/0168097 A1* | 8/2004 | Cook | G06F 8/4432 | 713/320 |
| 2004/0219923 A1* | 11/2004 | Oses | H04B 7/26 | 455/445 |
| 2005/0048985 A1* | 3/2005 | Haartsen | H04W 72/0446 | 455/453 |
| 2005/0164740 A1* | 7/2005 | Yoshii | H04L 1/0061 | 455/561 |
| 2005/0207385 A1* | 9/2005 | Gorokhov | H04L 5/0037 | 370/344 |
| 2006/0179329 A1* | 8/2006 | Terechko | G06F 1/3203 | 713/300 |
| 2007/0195731 A1* | 8/2007 | Camp | H04W 72/04 | 370/329 |
| 2007/0195809 A1* | 8/2007 | Blanz | H04L 1/0025 | 370/426 |
| 2008/0232240 A1* | 9/2008 | Baum | H04L 5/0007 | 370/210 |
| 2008/0316950 A1* | 12/2008 | Damnjanovic | H04W 52/34 | 370/311 |
| 2009/0003486 A1* | 1/2009 | Kwon | H04L 5/0007 | 375/299 |
| 2009/0125742 A1* | 5/2009 | Terechko | G06F 1/3203 | 713/323 |
| 2009/0128410 A1* | 5/2009 | Li | H04B 7/0617 | 342/367 |
| 2009/0154583 A1* | 6/2009 | Lee | H04L 5/0007 | 375/260 |
| 2009/0257390 A1* | 10/2009 | Ji | H04W 72/04 | 370/329 |
| 2009/0268680 A1* | 10/2009 | Nam | H04W 64/00 | 370/329 |
| 2009/0290549 A1* | 11/2009 | Tiirola | H04W 72/04 | 370/329 |
| 2009/0318180 A1* | 12/2009 | Yi et al. | H04W 52/365 | 455/522 |
| 2009/0318183 A1* | 12/2009 | Hugl | H04L 5/0023 | 455/522 |
| 2010/0046451 A1* | 2/2010 | Tada | H04W 4/10 | 370/329 |
| 2010/0113059 A1* | 5/2010 | Morimoto | H04W 4/10 | 455/452.2 |
| 2010/0128614 A1* | 5/2010 | Kuusela | H04L 12/5695 | 370/252 |
| 2010/0177721 A1* | 7/2010 | Simonsson | H04J 11/005 | 370/329 |
| 2010/0177722 A1* | 7/2010 | Guvenc | H04W 52/244 | 370/329 |
| 2010/0182903 A1* | 7/2010 | Palanki | H04L 1/0041 | 370/225 |
| 2010/0202400 A1* | 8/2010 | Richardson | H04W 8/005 | 370/330 |
| 2010/0260117 A1* | 10/2010 | Ojala | H04W 52/146 | 370/329 |
| 2010/0297995 A1* | 11/2010 | Macias | H04W 48/16 | 455/435.2 |
| 2010/0302964 A1* | 12/2010 | Guo | H04L 5/0007 | 370/252 |
| 2010/0322099 A1* | 12/2010 | Che | H04W 52/242 | 370/252 |
| 2010/0329204 A1* | 12/2010 | Guo | H04W 72/1278 | 370/329 |
| 2011/0007657 A1* | 1/2011 | Kazmi | H04J 11/0093 | 370/252 |
| 2011/0032890 A1* | 2/2011 | Wu | H04L 5/001 | 370/329 |
| 2011/0039568 A1* | 2/2011 | Zhang | H04W 74/002 | 455/452.1 |
| 2011/0182376 A1* | 7/2011 | Abe | H04L 5/0023 | 375/260 |
| 2011/0275399 A1* | 11/2011 | Englund | H04W 72/1231 | 455/513 |
| 2011/0286407 A1* | 11/2011 | Vajapeyam | H04W 16/10 | 370/329 |
| 2012/0039170 A1* | 2/2012 | Ball | H04L 5/0007 | 370/230 |
| 2012/0100853 A1* | 4/2012 | Xiong | H04W 48/16 | 455/436 |
| 2012/0188886 A1* | 7/2012 | Chen | H04L 5/001 | 370/252 |
| 2012/0202504 A1* | 8/2012 | Wegmann | H04W 28/08 | 455/438 |
| 2013/0155986 A1* | 6/2013 | Tiirola | H04W 72/04 | 370/329 |
| 2014/0080538 A1* | 3/2014 | Damnjanovic | H04W 52/34 | 455/522 |
| 2014/0153425 A1* | 6/2014 | Kazmi | H04J 11/0093 | 370/252 |

FOREIGN PATENT DOCUMENTS

| | | |
|---|---|---|
| CN | 101404526 A | 4/2009 |
| CN | 101449601 A | 6/2009 |
| WO | 2008115699 A1 | 9/2008 |
| WO | 2009108011 A1 | 9/2009 |
| WO | 2010060308 A1 | 6/2010 |

(56) References Cited

FOREIGN PATENT DOCUMENTS

OTHER PUBLICATIONS

"R4-091150—Proposal for Contiguous Carrier Aggregation," 3GPP TSG RAN WG4 Meeting #50bis, Mar. 23-27, 2009, 3GPP, Valbonne, France.
International Search Report in corresponding International Patent Application No. PCT/CN2009/074830 (Aug. 12, 2010).
International Search Report in corresponding International Patent Application No. PCT/CN2009/075012 (Aug. 19, 2010).
Written Opinion of the International Searching Authority in corresponding International Patent Application No. PCT/CN2009/074830 (Aug. 12, 2010).
Written Opinion of the International Searching Authority in corresponding International Patent Application No. PCT/CN2009/075012 (Aug. 19, 2010).
"R1-091781—Support of Carrier Aggregation for FDD and Related Control Signaling," 3GPP TSG RAN WG1 #57 Meeting, May 2009, 3GPP, Valbonne, France.
"R1-092416—Blind Decoding for Carrier Aggregation," 3GPP TSG RAN WG1 Meeting #57b, Jun. 2009, 3GPP, Valbonne, France.
"R1-093280—Blind Decoding in LTE-Advanced," 3GPP RAN WG1 Meeting #58, Aug. 2009, 3GPP, Valbonne, France.
Interim Certified Copy of International Patent Application No. PCT/CN2009/075012, Nov. 18, 2009.

* cited by examiner

METHOD AND DEVICE FOR RESOURCE CONFIGURATION

CROSS-REFERENCE TO RELATED APPLICATIONS

This application is a continuation of International Application No. PCT/CN2009/075012, filed on Nov. 18, 2009, which claims priority to International Application No. PCT/CN2009/074830, filed on Nov. 6, 2009, both of which are hereby incorporated by reference in their entireties.

FIELD OF THE INVENTION

The present invention relates to the field of communications, and in particular, to a method and a device for resource configuration.

BACKGROUND OF THE INVENTION

In a 3GPP (3rd Generation Partnership Project, 3rd generation partnership project) LTE (Long Term Evolution, long term evolution) system, an LTE Release 8 system (also called LTE REL-8) supports only several optional standard channel bandwidths which includes 1.4 MHz, 3 MHz, 5 MHz, 10 MHz, 15 MHz, and 20 MHz and are corresponding to transmission bandwidths 6 RBs, 15 RBs, 25 RBs, 50 RBs, 75 RBs, and 100 RBs (each RB is 180 KHz) respectively. With rapid development of a wireless service, a requirement imposed on a transmission speed becomes higher and higher. For example, a goal that a maximum transmission speed is 1 Gbit/s is set for the IMT-A (International Mobile Telecommunications System Advanced, international mobile telecommunications system advanced). In order to implement such a high transmission speed, people proposes that, in a version later than the LTE REL8, for example, in an LTE-A (LTE-Advanced, LTE-advanced) system, a larger transmission bandwidth is implemented through multi-carrier aggregation, that is to say, multiple continuous or non-continuous carriers with a bandwidth less than or equal to 20 MHz are aggregated together and used by one system at the same time.

In the LTE system, an RB (Resource Block, resource block) is a minimum resource allocation unit. Each RB includes one sub-frame in time and 12 sub-carriers in frequency. In each RB, an RS (Reference Signal, reference signal) signal used for channel estimation and measurement and data carrying data information can be transmitted. The RS can be classified into two types. One type is a CRS (Cell-specific RS, also called Common RS, common reference signal), where the CRS is transmitted in all non-MBSFN (Multicast Broadcast over a Single Frequency Network, multicast broadcast over a single frequency network) sub-frames and mainly used for channel estimation and measurement; and the other type is a DmRS (Demodulation RS, also called UE-Specific RS, specific reference signal), mainly used for channel estimation during beamforming. RSs are distributed in the RB as uniformly as possible in a certain manner. In the RB, each element capable of transmitting a signal is called an RE (Resource Element, resource element).

The inventors find that the prior art has at least the following disadvantages. In the LTE system, a guard band is reserved in an edge of a system bandwidth, and this frequency band is not used for transmitting a signal. Moreover, partial resources existing in a frequency band that does not satisfy a bandwidth standard are not used, thus decreasing a resource utilization rate.

SUMMARY OF THE INVENTION

Embodiments of the present invention provide a method and a device for resource configuration, so as to configure power of an extra resource block existing in a wireless resource, so that the extra resource block is used to transmit a signal, thus improving a resource utilization rate.

An embodiment of the present invention provides a method for resource configuration, including: determining an extra resource block existing in a wireless resource, where the extra resource block is a resource that cannot be identified by a long term evolution system; configuring transmission power of a resource element in the extra resource block according to a power configuration rule; and sending a signal on the resource element in the extra resource block according to configured transmission power.

An embodiment of the present invention provides another method for resource configuration, including: determining an extra resource block existing in a wireless resource, where the extra resource block is a resource that cannot be identified by a long term evolution system; configuring a receiving power relationship of a resource element in the extra resource block according to a power configuration rule; and receiving a signal on the resource element in the extra resource block according to a configured receiving power relationship.

An embodiment of the present invention provides a device for resource configuration, including: a first determining unit, adapted to determine an extra resource block existing in a wireless resource, where the extra resource block is a resource that cannot be identified by a long term evolution system; a first configuring unit, adapted to configure transmission power of a resource element in the extra resource block according to a power configuration rule; and a first sending unit, adapted to send a signal on the resource element in the extra resource block according to configured transmission power.

An embodiment of the present invention provides another device for resource configuration, including: a second determining unit, adapted to determine an extra resource block existing in a wireless resource, where the extra resource block is a resource that cannot be identified by a long term evolution system; a second configuring unit, adapted to configure a receiving power relationship of a resource element in the extra resource block according to a power configuration rule; and a second receiving unit, adapted to receive a signal on the resource element in the extra resource block according to a configured receiving power relationship.

Through the solutions provided in the embodiments of the present invention, the extra resource block in the wireless resource is determined, the transmission power of the resource element in the extra resource block is configured according to the power configuration rule, and data is sent on a corresponding resource element according to configured transmission power, or the receiving power relationship of the resource element in the extra resource block is configured according to the power configuration rule to receive a signal, so that the extra resource block can be used to transmit the signal, thus improving the resource utilization rate.

DETAILED DESCRIPTION OF THE EMBODIMENTS

In order to make persons skilled in the art understand the present invention better, the present invention is described in further detail in the following with reference to the accompanying drawings. It should be noted that, the following embodiments are only a part rather than all of the embodiments of the present invention, and persons skilled in the art may obtain other embodiments according to the following embodiments.

Figure 1:
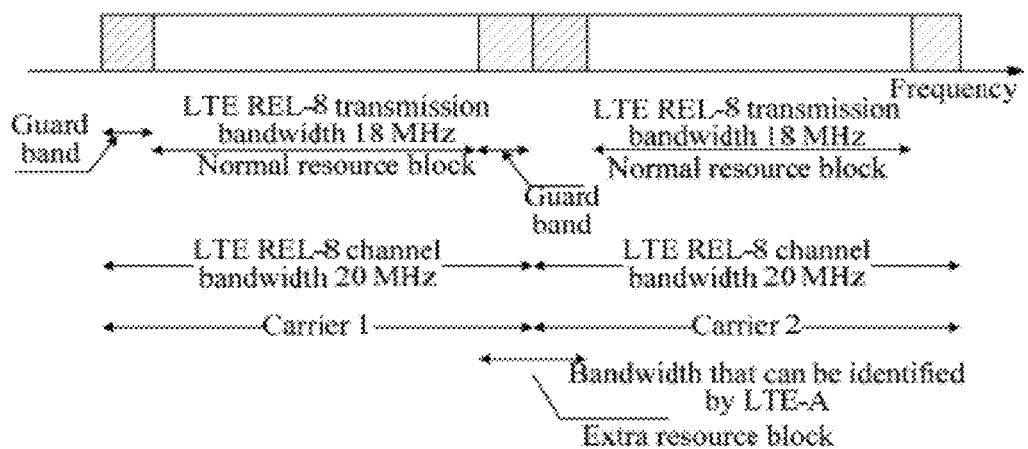
FIG. 1 is a schematic diagram of a section of system bandwidth in a carrier aggregation manner.
Figure 2:
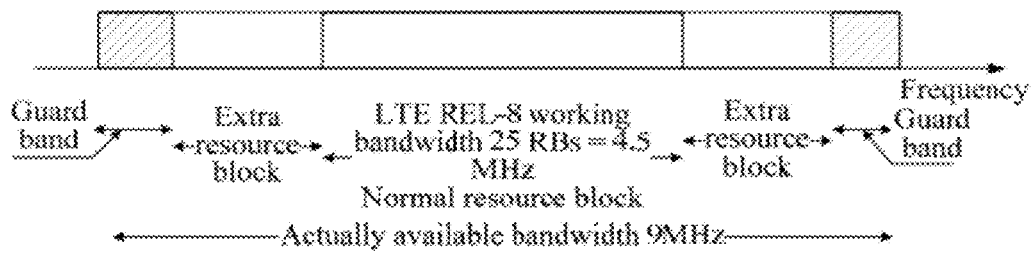
FIG. 2 is a schematic diagram of a non-standard bandwidth.

In an LTE system, partial resources in a system bandwidth are transmission bandwidths used for transmitting data, and an RB where a transmission bandwidth is located is called a normal RB. A guard band is reserved in an edge of each system bandwidth. The guard band cannot be used for transmitting any resource, and an RB where a corresponding frequency band is located is called an extra RB. Since these extra RBs cannot be used or identified by the LTE system, these extra RBs are resources that are incompatible with the LTE. FIG. 1 is a schematic diagram of a section of system bandwidth in a carrier aggregation manner. Two carriers whose bandwidths are 20 M are aggregated together. A guard band on a side of an original carrier is aggregated with a guard band on a side of the other carrier, and a guard band between the two aggregated carriers is called an extra RB. In another aspect, according to a 3GPP LTE protocol, an LTE REL-8 supports only certain standard channel bandwidths which includes 1.4 MHz, 3 MHz, 5 MHz, 10 MHz, 15 MHz, and 20 MHz and are corresponding to transmission bandwidths 6 RBs, 15 RBs, 25 RBs, 50 RBs, 75 RBs, and 100 RBs (each RB is 180 KHz) respectively, but an actual bandwidth is not limited to the preceding standard bandwidths. In an actual system, a bandwidth that is unequal to a standard bandwidth is also called a non-standard bandwidth. A part obtained by deducting a guard band and a transmission bandwidth that can be identified by an REL-8 system from the non-standard bandwidth may also be called an extra resource block (Extra Resource Block). FIG. 2 is a schematic diagram of a non-standard bandwidth. A non-standard bandwidth (actually available bandwidth) is 9 MHz. According to an REL-8 protocol, only a standard bandwidth, that is, 5 MHz, less than the available bandwidth can be used. An actual bandwidth that can be used for data transmission in the 5 MHz available bandwidth is 25 RBs, that is, 4.5 MHz. The 4.5 MHz bandwidth is used as a normal RB and is a transmission bandwidth that can be identified by the REL-8 system. A part between the guard band and the normal RB cannot be identified by the REL-8 system and is called an extra RB.

Figure 3:
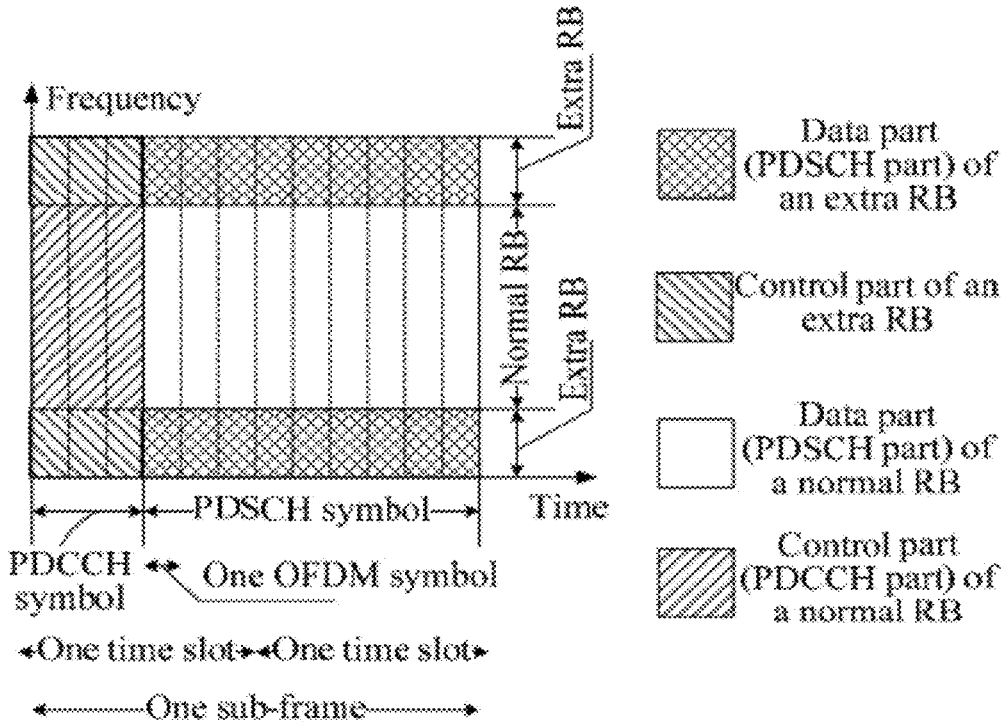
FIG. 3 is a schematic diagram of a resource block.

The preceding bandwidth division is based on a frequency domain. In a time domain, in the LTE system, the first one, two, three, or four symbols of each sub-frame are used for transmitting a PDCCH (Physical Downlink Control Channel, physical downlink control channel), cannot be used for transmitting a PDSCH (Physical Downlink Shared Channel, physical downlink shared channel), and are called PDCCH symbols. A part where a PDCCH symbol is located is called a control part. A symbol other than the PDCCH symbol can be used for transmitting the PDSCH and is called PDSCH symbol. A part where a PDSCH symbol is called a data part. FIG. 3 is a schematic diagram of a resource block. In a time direction, a sub-frame includes 12 symbols. The first three symbols are PDCCH symbols and are a control part. The last nine symbols are PDSCH symbols and are a data part. In a frequency direction, an extra RB and a normal RB are included.

Figure 4:
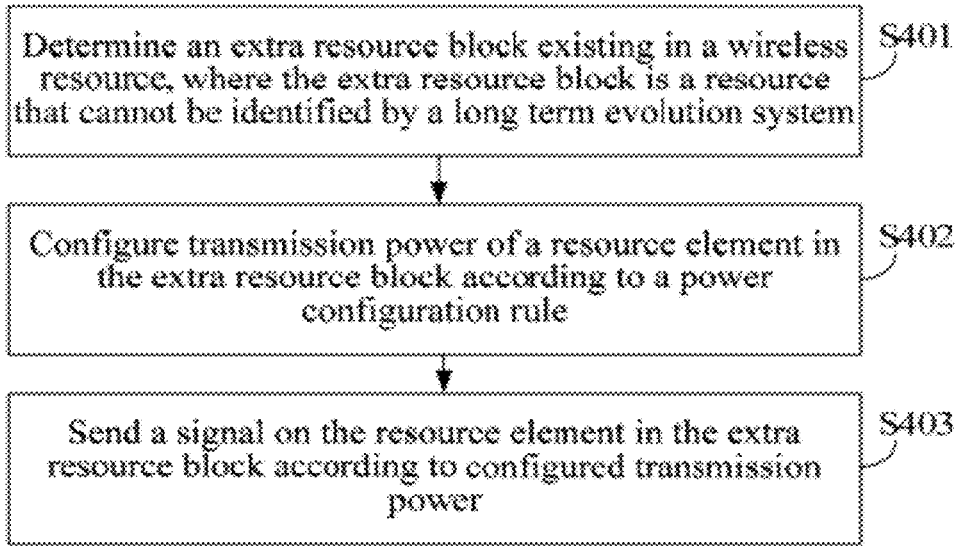
FIG. 4 is a schematic diagram of a method for resource configuration according to an embodiment of the present invention.

FIG. 4 is a schematic diagram of a method for resource configuration according to an embodiment of the present invention. The method includes:

S401: Determine an extra resource block existing in a wireless resource, where the extra resource block is a resource that cannot be identified by a long term evolution system.

S402: Configure transmission power of a resource element in the extra resource block according to a power configuration rule.

S403: Send a signal on the resource element in the extra resource block according to configured transmission power.

In this embodiment, the resource that cannot be identified by the long term evolution system is first determined, where the resource that cannot be identified by the long term evolution system is a resource that is not used by the long term evolution system, that is, the mentioned extra resource block in the wireless resource in this embodiment; the transmission power of the resource element in the extra resource block is configured according to the power configuration rule; and the signal is sent on a corresponding resource element according to the configured transmission power, so that a wireless resource that cannot be identified by the long term evolution system can be effectively used, thus improving a resource utilization rate. In this embodiment, the normal resource block is a resource block that can be used by an LTE system, and is generally a frequency band in an LTE system transmission band satisfying a bandwidth standard; and the extra resource block is a guard band of the LTE system or a frequency band other than a standard bandwidth in the LTE system transmission band, therefore, the extra resource block cannot be identified and used by the long term evolution system.

The power configuration rule in this embodiment specifies energy with which the resource element in the extra resource block should be configured. The rule may be set by persons skilled in the art according to a requirement to achieve a power configuration result expected by persons skilled in the art. In a specific application, the configuring the transmission power of the resource element in the extra resource block may include: configuring transmission power of a resource element, for transmitting data, in a data part of the extra resource block to be the same as transmission power of a resource element, for transmitting data, in the same symbol of the normal resource block, where the data is a PDSCH; configuring transmission power of a resource element, for transmitting data, in a control part of the extra resource block to be the same as transmission power of a resource element, for transmitting data, in a symbol of the normal resource block, where the symbol of the normal resource block has the same attribute; or configuring transmission power of a resource element, for transmitting a common reference signal, in the extra resource block to be the same as transmission power of a resource element, for transmitting a common reference signal, in the normal resource block, where the symbol that has the same attribute refers to a symbol that transmits a reference signal or a symbol that does not transmit the reference signal. Since a manner for configuring power of the extra resource block is the same as that for configuring power of the normal resource block, power for sending a signal on the resource element in the extra resource block is the same as that for sending a signal on the resource element in the normal resource block. It can be understood that, if the transmission power of the resource element in the extra resource block is different from the transmission power of the resource element in the normal resource block, implementation of this embodiment is not affected. When the transmission power of the resource element in the extra resource block is lower than the transmission power of the resource element, for transmitting the data, in the normal resource block, an effect of transmission power of the extra resource block on data transmission of the normal resource block may be decreased, and transmission quality of the normal resource block may be improved. In this embodiment, the transmission power is also called transmission energy.

In a specific application, a terminal may be notified of the power configuration rule, where the notification process may be implemented in a high-level signaling form. It can be understood by persons skilled in the art that, the notification process is not indispensible in this embodiment, and a configuration rule may be preset inside the terminal. If both a base station and the terminal perform power configuration according to a pre-determined rule, the base station does not need to notify the terminal of the configuration through signaling. In specific implementation, the power configuration rule may include that, transmission power of the resource element in the data part of the extra resource block is less than or equal to transmission power of the resource element, for transmitting the common reference signal, in the normal resource block, and transmission power of the resource element in the control part of the extra resource block is less than or equal to the transmission power of the resource element, for transmitting the common reference signal, in the normal resource block. In this way, the effect of the transmission power of the extra resource block on the data transmission of the normal resource block may be decreased, and the transmission quality of the normal resource block may be improved. Another power configuration rule may include that, transmission power of the resource element, for transmitting data, in the data part of the extra resource block is set to be equal to transmission power of a resource element, for transmitting a reference signal that is used for demodulation, in the data part of the extra resource block, and transmission power of the resource element, for transmitting data, in the control part of the extra resource block is set to be equal to transmission power of a resource element, for transmitting a reference signal that is used for demodulation, in the control part of the extra resource block. With this rule, demodulation complexity may be reduced, and meanwhile, a singling overhead caused by sending the power configuration rule may be reduced. Another power setting rule may include that, transmission power of the resource element, for transmitting data, in the data part of the extra resource block is set to be equal to transmission power of a resource element, for transmitting a reference signal that is used for demodulation, in the data part of the extra resource block, and transmission power of all resource elements in the control part of the extra resource block is set to 0. With this setting, interference of the control part of the extra resource block on another user control part may be reduced, and more power resources may be reserved for the resource element in the control part of the normal resource block. Other possible configuration rules are not listed in this embodiment one by one.

Figure 5:
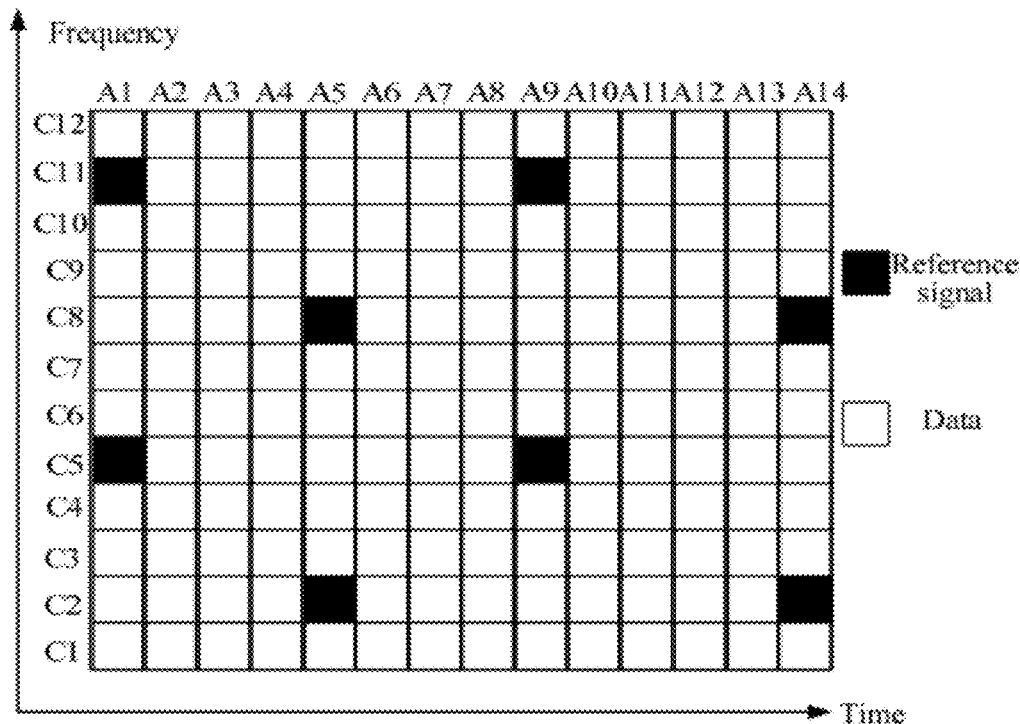
FIG. 5 is a schematic structural diagram of a resource block according to an embodiment of the present invention.

In an LTE or LTE-A system, an RB is a minimum resource allocation unit. By taking the LTE-A system as an example, in each RB frequency domain, 14 sub-carriers are included, and in a time domain, one sub-frame is included. FIG. 5 is a schematic structural diagram of a resource block according to an embodiment of the present invention. In a time domain, a resource block includes two slots, where symbols A1 to A7 form a slot, symbols A8 to A14 form a slot, and each slot includes seven symbols; and in a frequency domain, the resource block includes 12 sub-carriers, represented by C1 to C12 respectively, where each grid in an RB represents a resource element (RE, Resource Element), and each RE may transmit a reference signal (RS, Reference Signal) that is used for channel estimation and measurement or data. The RS can be classified into two types. One type is a CRS (Cell-specific RS, also called Common RS, common reference signal), where the CRS is transmitted in all non-MBSFN (Multicast Broadcast over a Single Frequency Network, multicast broadcast over a single frequency network) sub-frames and mainly used for channel estimation and measurement; and the other type of RS is a DRS (Demodulation RS, also called UE-Specific RS, specific reference signal), mainly used for channel estimation during beamforming (beamforming). RSs are distributed in the RB as uniformly as possible in a certain manner.

In an LTE system, power for transmitting a CRS and power for transmitting data may be different, and power for transmitting a symbol that includes a CRS and power for transmitting a symbol that does not include a CRS may also be different. Energy for an RE in each symbol transmitting a PDSCH (Physical Downlink Shared Channel, physical downlink shared channel) is PDSCH EPRE (Energy Per Resource Element, energy per resource element). Energy for an RE in each symbol transmitting a CRS is CRS EPRE. A ratio of PDSCH EPRE of a symbol that does not include a CRS to CRS EPRE of the symbol that does not include a CRS is $\rho_A$. A ratio of PDSCH EPRE of a symbol that includes a CRS to CRS EPRE of the symbol that includes a CRS is $\rho_B$. For a sub-frame of an RB block, in the case of one antenna or two antennas, symbols that include the CRS are symbols 0 and 4, and symbols that do not include the CRS are symbols 1, 2, 3, 5, and 6. That is to say, for a single antenna or two antennas, energy of PDSCH carried by each RE in the symbols 1, 2, 3, 5, and 6 is equal, and a ratio of PDSCH EPRE of each of the symbols 1, 2, 3, 5, and 6 to CRS EPRE of each of the symbols 1, 2, 3, 5, and 6 is $\rho_A$; energy of PDSCH carried by each RE in the symbols 0 and 4 is equal, and a ratio of PDSCH EPRE of each of the symbols 0 and 4 to CRS EPRE of each of the symbols 0 and 4 is $\rho_B$.

In specific implementation, energy of REs in a data part of an extra RB for transmitting reference signals with the same type may be set to be equal. The reference signals may be classified into a CRS, a CSI-RS, and a DmRS; accordingly, the REs may be classified into a CRS RE, a CSI-RS RE, and a DmRS RE according to transmission types of reference signals. According to the preceding setting, EPRE of all CRS REs in the data part of the extra RB is equal, EPRE of all CSI REs in the data part of the extra RB is equal, and EPRE of all CSI-RSs or EPRE of all DmRSs in the data part of the extra RB is equal.

In the data part of the extra RB, a ratio of energy for an RE in the extra RB transmitting a reference signal to energy for an RE in a normal RB transmitting a CRS may be set to $\rho_C$, and a ratio of the energy for the RE in the extra RB transmitting the reference signal to energy for the RE in the normal RB transmitting the reference signal may be set to $\rho_D$. Here, the reference signal may be a CRS, a CSI-RS, or a DmRS.

In the data part of the extra RB, a ratio of energy for an RE in a symbol transmitting a PDSCH to energy for an RE in the data part of the extra RB transmitting a reference signal may be set to be constant, where the symbol does not include the reference signal, and the ratio is $\rho_E$.

In the data part of the extra RB, a ratio of energy for an RE in a symbol transmitting a PDSCH to the energy for the RE in the data part of the extra RB transmitting the reference signal may be set to be constant, where the symbol includes the reference signal, and the ratio is $\rho_F$.

Energy of REs in a control part of the extra RB for transmitting reference signals with the same type may be set to be equal. The reference signals may be classified into a CRS, a CSI-RS, and a DmRS; accordingly, the REs may be classified into a CRS RE, a CSI-RS RE, and a DmRS RE according to transmission types of reference signals. According to the preceding setting, EPRE of all CRS REs in the control part of the extra RB is equal, EPRE of all CSI-RS REs in the control part of the extra RB is equal, and EPRE of all DmRSs in the control part of the extra RB is equal.

In the control part of the extra RB, a ratio of energy for an RE in the extra RB transmitting a reference signal to energy for an RE in the normal RB transmitting a CRS may be set to $\rho_G$, and a ratio of the energy for the RE in the extra RB transmitting the reference signal to energy for the RE in the normal RB transmitting the reference signal may be set to $\rho_H$. Energy for REs in the control part of the extra RB transmitting each type of reference signals may be set to be equal. A ratio of energy for an RE in the control part of the extra RB transmitting a reference signal to energy for an RE in the data part of the extra RB transmitting the reference signal may be set to $\rho_I$.

A ratio of energy for an RE in a symbol in the control part of the extra RB transmitting a PDSCH to energy for an RE in each control part transmitting a reference signal may be set to be constant, where the symbol in the control part of the extra RB does not transmit the reference signal, and the ratio is $\rho_J$.

A ratio of energy for an RE in a symbol in the control part of the extra RB transmitting a PDSCH to the energy for the RE in each control part transmitting the reference signal may be set to be constant, where the symbol in the control part of the extra RB transmits the reference signal, and the ratio is $\rho_K$.

If a DmRS is transmitted in the extra RB, furthermore, energy for an RE in the control part of the extra RB transmitting the DmRS and energy for an RE in the control part of the extra RB transmitting a PDSCH may be set to be equal.

Furthermore, a terminal may be notified of the preceding setting results through singling.

A base station may notify the terminal of a value of the energy for the RE in the data part of the extra RB transmitting the reference signal through signaling. A specific notification method may be: directly notifying the terminal of the energy for the RE in the data part of the extra RB transmitting the reference signal, notifying the terminal of the ratio $\rho_C$ of the energy for the RE in the data part of the extra RB transmitting the reference signal to the energy for the RE in the normal RB transmitting the CRS, or notifying the terminal of the ratio $\rho_D$ of the energy for the RE in the data part of the extra RB transmitting the reference signal to the energy for the RE in the normal RB transmitting the reference signal.

The base station may notify the terminal of a value of the energy for the RE in the control part of the extra RB transmitting the reference signal through signaling. A specific notification method may be: directly notifying the terminal of the energy for the RE in the control part of the extra RB transmitting the reference signal, notifying the terminal of the ratio $\rho_G$ of the energy for the RE in the control part of the extra RB transmitting the reference signal to the energy for the RE in the normal RB transmitting the CRS, notifying the terminal of the ratio $\rho_H$ of the energy for the RE in the control part of the extra RB transmitting the reference signal to the energy for the RE in the normal RB transmitting the reference signal; or notifying the terminal of the ratio $\rho_I$ of the energy for the RE in the control part of the extra RB transmitting the reference signal to the energy for the RE in the data part of the extra RB transmitting the reference signal.

The base station may also notify, through the signaling, a UE of the following: the ratio $\rho_E$ of the energy for the RE in the symbol in the data part of the extra RB transmitting the PDSCH to the energy for the RE in the data part of the extra RB transmitting the reference signal, where the symbol in the data part of the extra RB does not include the reference signal; the ratio $\rho_F$ of the energy for the RE in the symbol in the data part of the extra RB transmitting the PDSCH to the energy for the RE in the data part of the extra RB transmitting the reference signal, where the symbol in the data part of the extra RB includes the reference signal; the ratio $\rho_J$ of the energy for the RE in the symbol in the control part of the extra RB transmitting the PDSCH to the energy for the RE in the control part of the extra RB transmitting the reference signal, where the symbol in the control part of the extra RB does not include the reference signal; and the ratio $\rho_K$ of the energy for the RE in the symbol in the control part of the extra RB transmitting the PDSCH to the energy for the RE in the control part of the extra RB transmitting the reference signal, where the symbol in the control part of the extra RB includes the reference signal. To facilitate the description, in this embodiment, the RE, for transmitting the PDSCH, in the symbol that does not include the reference signal, is called a first RE, and the RE, for transmitting the PDSCH, in the symbol that includes the reference signal, is called a second RE.

During the preceding configuration, each terminal may be configured separately, and multiple terminals may also be configured in the same manner. For example, configuration values of terminals in multiple cells may be the same. Specifically, the $\rho_C$, $\rho_D$, $\rho_E$, $\rho_F$, $\rho_G$, $\rho_H$, $\rho_I$, $\rho_J$, or $\rho_K$ may be set for each UE, and the same value of the $\rho_C$, $\rho_D$, $\rho_E$, $\rho_F$, $\rho_G$, $\rho_H$, $\rho_I$, $\rho_J$, or $\rho_K$, that is, a value is set for a cell, may also be used for UEs in one cell. Setting a value of the $\rho_E$, $\rho_F$, $\rho_J$, or $\rho_K$ for each UE respectively is a common manner, and setting a value of the $\rho_C$, $\rho_D$, $\rho_G$, $\rho_H$, or $\rho_I$ for the cell is a common implementation manner.

Furthermore, for different carriers, values of $\rho_C$, $\rho_D$, $\rho_E$, $\rho_F$, $\rho_G$, $\rho_H$, $\rho_I$, $\rho_J$, or $\rho_K$ may also be different. For example, different carriers of the same terminal may have different values of $\rho_C$, $\rho_D$, $\rho_E$, $\rho_F$, $\rho_G$, $\rho_H$, $\rho_I$, $\rho_J$, or $\rho_K$, or different carriers in the same cell may have different values of $\rho_C$, $\rho_D$, $\rho_E$, $\rho_F$, $\rho_G$, $\rho_H$, $\rho_I$, $\rho_J$, or $\rho_K$.

Furthermore, values of any two of ratios $\rho_C$, $\rho_D$, $\rho_E$, $\rho_F$, $\rho_G$, $\rho_H$, $\rho_I$, $\rho_J$, and $\rho_K$ may be equal. For example, $\rho_E=\rho_F$ and $\rho_J=\rho_K$, or $\rho_E=\rho_J$ and $\rho_F=\rho_K$, or $\rho_E=\rho_F=\rho_J=\rho_K$. In this case, the UE may be notified of any one of the preceding ratios, so that the terminal can know a setting situation at a base station side according to the ratio. Alternatively, any one of the preceding ratios may be a pre-defined value. In this case, the terminal does not need to be notified, and the terminal can acquire a corresponding ratio according a pre-defined rule.

Furthermore, when a signal is sent according to configured energy, physical resource mapping and speed matching of the extra RB may be different from those of the normal RB. A PDSCH bit that may be carried by the extra RB is calculated according to the following formula: $(P-Q) \times L$, where P is the total number of REs of the extra RB, Q is the number of reference signals of the extra RB, L is a modulation order, for QPSK modulation, L=2; for 16 QAM, L=4; and for 64 QAM, L=6. Specifically, if the control part of the extra RB is not used for transmitting a PDSCH, and reference signal design of the data part of the extra RB is completely consistent with reference signal design of the data part of the normal RB, the number of PDSCH bits that may be carried by the extra RB is the same as the number of PDSCH bits that may be carried by the normal RB. If the control part of the extra RB is used for transmitting a PDSCH, reference signal distribution of the control part of the extra RB is consistent with reference signal distribution of the control part of the normal RB, and reference signal distribution of the data part of the extra RB is completely consistent with the reference signal design of the data part of the normal RB, being relative to the normal RB, the number of PDSCH bits that are newly added in each extra RB and may be carried by each extra RB is $(N \times 12 - R) \times L$, where N is the number of PDCCH symbols of the RB, R is the number of REs that carry reference signals in a control part of the RB, and L is a modulation order. If the control part of the extra RB is used for transmitting a PDSCH, and a RE that transmits a CRS in the control part and the data part of the extra RB is also used for transmitting PDSCH data, the number of bits that are newly added in each RB and may be carried by each RB is $(N \times 12 - R + M) \times L$, where R is the total number of the reference signal REs in the control part of the extra RB, including a sum of the numbers of empty REs that are stopped being sent in order to avoid CRS collision between different antennas when the number of antennas is greater than 1, M is the total number of REs that transmit CRSs in the control part and the data part of the extra RB, including the sum of the numbers of empty REs that are stopped being sent in order to avoid CRS collision between different antennas when the number of antennas is greater than 1.

Accordingly, the terminal may receive a signal from the base station according to the power setting. It should be noted that, in this embodiment of the present invention, there is no obvious sequence order between the steps of setting transmission power of an RE in each part, and any adjustment of the steps falls within the scope defined by the present invention. In this embodiment of the present invention, the reference signal in the control part of the extra RB may be the same as the reference signal in the data part of the extra RB. For example, the reference signals are both a CSI-RS. The reference signals may also be different. For example, a specific reference signal in the data part is a CSI-RS; while a specific reference signal in the control part is a CRS.

With the method provided in this embodiment of the present invention, different power can be allocated to REs that transmit different signals in different parts of the extra RB, so that transmission power of different REs in each part can be flexibly controlled, and therefore, valuable power resources are flexibly allocated to REs with different power requirements, and a system throughput is improved.

Figure 6:
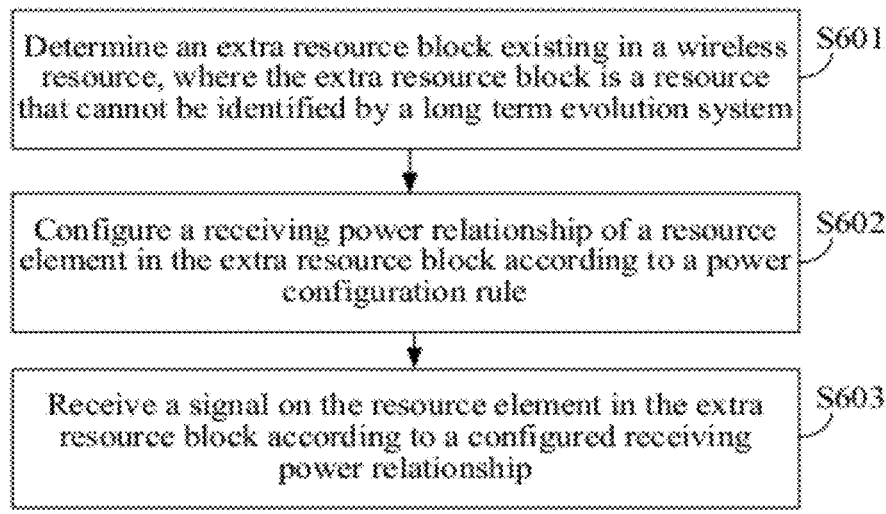
FIG. 6 is a schematic diagram of another method for resource configuration according to an embodiment of the present invention.

FIG. 6 is a schematic diagram of another method for resource configuration according to an embodiment of the present invention. The method includes:

S601: Determine an extra resource block existing in a wireless resource, where the extra resource block is a resource that cannot be identified by a long term evolution system.

S602: Configure a receiving power relationship of a resource element in the extra resource block according to a power configuration rule.

S603: Receive a signal on the resource element in the extra resource block according to a configured receiving power relationship.

This embodiment is corresponding to the preceding resource configuration method embodiment. A terminal may configure a receiving power relationship according to a predetermined rule and receive a signal, so that a signal transmitted on a resource element in an extra resource block can also be correctly received by the terminal, thus making full use of a resource. In this embodiment, the receiving power relationship is corresponding to sending power of a sending end (a base station). The receiving power relationship is set, so that the terminal can receive the signal according to the set receiving power relationship. The receiving power relationship reflects a power relationship between different resource elements in an extra resource block. A receiving power relationship in a specific situation may be a receiving power ratio of different resource elements in an extra resource block. This method embodiment may further include: receiving a power configuration rule sent by the base station, where a process of the base station notifying the power configuration rule may be implemented through high-level signaling. It may be understood that, the terminal may not need to receive the configuration rule from the base station. The configuration rule may be preset inside the terminal. The base station and the terminal may set transmission energy by using the same preset rule. For a specific configuration method, reference may be made to the description of the preceding embodiment, which is not described here again. The power configuration rule may include that, transmission power of a resource element in a data part of the extra resource block is less than or equal to transmission power of a resource element, for transmitting a common reference signal, in a normal resource block, and transmission power of a resource element in a control part of the extra resource block is less than or equal to the transmission power of the resource element, for transmitting the common reference signal, in the normal resource block. Other possible configuration rules are not listed in this embodiment one by one.

In S602, the receiving power relationship is corresponding to the power configuration rule, so that a receiving power ratio of different REs may be equal to a transmission power ratio, and the terminal receives the signal on the resource element in the extra resource block according to the configured receiving power relationship. In a specific embodiment, a terminal receives from a base station the following: a ratio $\rho_C$ of energy for an RE in an extra data part transmitting a reference signal to energy for an RE in a normal RB transmitting a CRS, a ratio $\rho_E$ of energy for an RE in a symbol in the data part of the extra RB transmitting a PDSCH to energy for an RE in the data part of the extra RB transmitting a reference signal, where the symbol in the data part of the extra RB does not include the reference signal, a ratio $\rho_F$ of energy for an RE in a symbol in the data part of the extra RB transmitting a PDSCH to the energy for the RE in the data part of the extra RB transmitting the reference signal, where the symbol in the data part of the extra RB includes the reference signal, a ratio $\rho_G$ of energy for an RE in a control part of the extra RB transmitting a reference signal to the energy for the RE in the normal RB transmitting the CRS, a ratio $\rho_J$ of energy for an RE in a symbol in the control part of the extra RB transmitting a PDSCH to the energy of the RE in the data part of the extra RB transmitting the reference signal, where the symbol in the control part of the extra RB does not include the reference signal, and a ratio $\rho_K$ of energy for an RE in a symbol in the control part of the extra RB transmitting a PDSCH to the energy for the RE in the data part of the extra RB transmitting the reference signal, where the symbol in the control part of the extra RB includes the reference signal, so that a relative power ratio relationship for receiving a signal on the extra RB may be determined, that is, a ratio of energy for an RE in the data part of the extra RB receiving a reference signal to energy for an RE in the normal RB receiving a CRS is $\rho_C$, a ratio of energy for an RE in a symbol in the data part of the extra RB receiving a PDSCH to the energy for the RE in the data part of the extra RB receiving the reference signal is $\rho_E$, where the symbol in the data part of the extra RB does not include the reference signal, a ratio of energy for an RE in a symbol in the data part of the extra RB for receiving a PDSCH to the energy for the RE in the data part of the extra RB receiving the reference signal is $\rho_F$, where the symbol in the data part of the extra RB includes the reference signal, a ratio of energy for an RE in a control part of the extra RB receiving a reference signal to the energy for the RE in the normal RB receiving the CRS is $\rho_G$, a ratio of energy for an RE in a symbol in the control part of the extra RB receiving a PDSCH to the energy for the RE in the data part of the extra RB receiving the reference signal is $\rho_J$, where the symbol in the control part of the extra RB does not include the reference signal, and a ratio of energy for an RE in a symbol in the control part of the extra RB receiving a PDSCH to the energy for the RE in the data part of the extra RB receiving the reference signal is $\rho_K$, where the symbol in the control part of the extra RB includes the reference signal. After determining a receiving power relationship of different REs in an RB, the terminal measures channel quality according to the configured receiving power relationship. For example, when average receiving power of a CRS of a normal RB is measured, statistics may also be performed on corresponding average receiving power of a CRS in the control part of the extra RB, where the corresponding average receiving power of the CRS in the control part of the extra RB is multiplied by $1/\rho_C$, and average receiving power of a CRS in the data part of the extra RB, where the average receiving power of the CRS in the data part of the extra RB is multiplied by $1/\rho_G$. Alternatively, data is demodulated according to the configured receiving power relationship. For example, if channel estimation and QAM demodulation are performed by using the CRS, smoothing of the channel estimation and amplitude judgment on the QAM demodulation need to be performed according to a corresponding receiving power relationship. Specific receiving processes including channel quality measurement and data demodulation that are performed by the terminal according to the receiving power relationship are both existing technologies and are not described again in this embodiment of the present invention.

In order to reduce a signaling overhead, in this embodiment of the present invention, a certain rule may be preset, so that specific energy ratios are the same. For example, some values of $\rho_A$, $\rho_B$, $\rho_C$, $\rho_D\rho_E\rho_F$, $\rho_G$, $\rho_H$, $\rho_I$, $\rho_J$, and $\rho_K$ are the same. An embodiment of the present invention is given in the following. In this embodiment, whether in an extra RB or in a normal RB, whether in a control part or in a data part, ratios of energy for REs in all symbols transmitting a PDSCH, where the all symbols do not include reference signals, to energy for REs in each part transmitting a reference signal are equal, which are all equal to $\rho_A$, and ratios of energy for REs in all symbols transmitting a PDSCH, where the all symbols include reference signals, to energy for REs in each part transmitting a reference signal are equal, which are all equal to $\rho_B$, that is, $\rho_E = \rho_J = \rho_A$ and $\rho_F = \rho_K = \rho_B$. Specifically, energy for all REs in the data part of the extra RB transmitting reference signals may be set to be equal. A ratio of energy for an RE in a symbol in the data part of the extra RB transmitting a PDSCH, where the symbol in the data part of the extra RB does not include a reference signal, to energy for an RE in the data part of the extra RB transmitting a reference signal is set to be constant, and the ratio is $\rho_A$. A ratio of energy for an RE in a symbol in the data part of the extra RB transmitting a PDSCH, where the symbol in the data part of the extra RB includes a reference signal, to the energy for the RE in the data part of the extra RB transmitting the reference signal is set to be constant, and the ratio is $\rho_B$. Energy for all REs in the control part of the extra RB transmitting reference signals is set to be equal. A ratio of energy for an RE in a symbol in the control part of the extra RB transmitting a PDSCH, where the symbol in the control part of the extra RB does not include a reference signal, to energy of an RE in the control part of the extra RB transmitting a reference signal is set to be constant, and the ratio is $\rho_A$. A ratio of energy for an RE in a symbol in the control part of the extra RB transmitting a PDSCH, where the symbol in the control part of the extra RB includes a reference signal, to the energy for the RE in the control part of the extra RB transmitting the reference signal is set to be constant, and the ratio is $\rho_B$. If the extra RB includes a DmRS, energy for an RE in the extra RB transmitting the DmRS is further set to be equal to energy for an RE in the extra RB transmitting a PDSCH.

With the method provided in this embodiment of the present invention, transmission power can be flexibly allocated in different parts of the extra RB, so that valuable power resources are used for maximally improving system performance, and therefore, a problem that waste of a system frequency and a power resource is caused by transmitting a useless CRS signal in the extra RB is relieved, and a system throughout is improved.

In the preceding setting process, energy is allocated based on an RE that transmits a reference signal. It can be understood that, in this embodiment, energy may also be allocated based on energy of an RE, for transmitting a PDSCH, in a symbol that does not include a reference signal. Specifically, energy for REs in symbols in a data part of an extra RB transmitting PDSCHs may be set to be equal, where the symbols in the data part of the extra RB do not include reference signals. Furthermore, a ratio of energy for an RE in a symbol in the data part of the extra RB transmitting a PDSCH, where the symbol in the data part of the extra RB does not include a reference signal, to energy for an RE in a symbol of a normal RB transmitting a PDSCH, where the symbol of the normal RB does not include a CRS, may be set to $\rho_L$. A ratio of energy for an RE in a symbol in the data part of the extra RB transmitting a PDSCH, where the symbol in the data part of the extra RB includes a reference signal, to the energy of the RE in the symbol in the data part of the extra RB transmitting the PDSCH, where the symbol in the data part of the extra RB does not include the reference signal, may be set to be constant, and the ratio is $\rho_M$. Furthermore, $\rho_M$ may be preset to be equal to $\rho_A/\rho_B$, or $\rho_M = 1$ (0 dB) may be preset. In the two cases, a UE does not need to be notified of a value of the $\rho_M$ through signaling. A ratio of energy for an RE in a symbol in a control part of the extra RB transmitting a PDSCH, where the symbol in the control part of the extra RB does not include a reference signal, to the energy for the RE in the symbol in the data part of the extra RB transmitting the PDSCH, where the symbol in the data part of the extra RB does not include the reference signal, may be set to $\rho_N$. Furthermore, the energy for the RE in the symbol in the control part of the extra RB transmitting the PDSCH, where the symbol in the control part of the extra RB does not include the reference signal, is equal to the energy for the RE in the symbol in the data part of the extra RB transmitting the PDSCH, where the symbol in the data part of the extra RB does not include the reference signal. In this case, the UE does not need to be notified of a value of $\rho_N$ through signaling. A ratio of energy for an RE in a symbol in the control part of the extra RB transmitting a PDSCH, where the symbol in the control part of the extra RB includes a reference signal, to the energy for the RE in the symbol in the data part of the extra RB transmitting the PDSCH, where the symbol in the data part of the extra RB does not include the reference signal, may be set to $\rho_O$. Furthermore, $\rho_O$ may be preset to be equal to $\rho_A/\rho_B$, or $\rho_O=1$ (0 dB) may be preset. In the two cases, the UE does not need to be notified of a value of $\rho_O$ through signaling.

If the extra RB includes a DmRS, energy for an RE in the extra RB transmitting the DmRS may further be set to be equal to energy for an RE in the extra RB transmitting a PDSCH.

During the preceding configuration, each terminal may be configured separately, and multiple terminals may also be configured in the same manner. For example, configuration values of terminals in multiple cells may be the same. Specifically, the $\rho_L$, $\rho_M$, $\rho_N$, and $\rho_O$ may be set for each UE, and the same value of the $\rho_L$, $\rho_M$, $\rho_N$, and $\rho_O$, that is, a value is set for a cell, may also be used for UEs in one cell. Setting values of the $\rho_L$ and $\rho_N$ for each UE respectively is a common manner, and setting values of the $\rho_M$ and $\rho_O$ for the cell is a common implementation manner.

Furthermore, for different carriers, values of the $\rho_L$, $\rho_M$, $\rho_N$, and $\rho_O$ may also be different. For example, different carriers of the same terminal may have different values of $\rho_L$, $\rho_M$, $\rho_N$, and $\rho_O$, or different carriers in the same cell may have different values of $\rho_L$, $\rho_M$, $\rho_N$, and $\rho_O$.

Furthermore, values of any two of ratios $\rho_L$, $\rho_M$, $\rho_N$, and $\rho_O$ may be equal. For example, $\rho_L=\rho_N$, $\rho_M=\rho_O$, or $\rho_L=\rho_N=\rho_M=\rho_O$. In this case, the UE may be notified of any one of the preceding ratios, so that the terminal can know a setting situation at a base station side according to the ratio. Alternatively, any one of the preceding ratios may be a pre-defined value. In this case, the terminal does not need to be notified, and the terminal can acquire a corresponding ratio according a pre-defined rule.

With the method provided in this embodiment of the present invention, different power can be allocated to REs that transmit different signals in different parts of the extra RB, so that transmission power of different REs in each part can be flexibly controlled, and therefore, valuable power resources are flexibly allocated to REs with different power requirements, and a system throughput is improved.

Furthermore, in this embodiment of the present invention, in the extra RB, a CSI-RS and a CRS may not be transmitted, and only PDSCH data and a DmRS are transmitted. In this case, energy of each RE in all data parts of the extra RB may further be set to be equal, and energy of each RE in all control parts of the extra RB may be set to be equal. Furthermore, the terminal may be notified, through signaling, of a ratio of energy of an RE in a data part of the extra RB to energy for an RE in a normal RB transmitting a CRS; or the terminal may be notified, through signaling, of a ratio of the energy of the RE in the data part of the extra RB to energy for an RE in the normal RB transmitting a PDSCH. The terminal may also be notified, through signaling, of a ratio of energy of an RE in a control part of the extra RB to the energy for the RE in the normal RB transmitting the CRS; or the terminal may be notified, through signaling, of a ratio of the energy of the RE in the control part of the extra RB to the energy for the RE in the normal RB transmitting the PDSCH; or the terminal may be notified, through signaling, of a ratio of the energy of the RE in the control part of the extra RB to the energy of the RE in data part of the extra RB. If a DmRS is transmitted in the extra RB, energy for an RE in the extra RB transmitting the DmRS may further be set to be equal to energy for an RE in the extra RB transmitting a PDSCH. According to the preceding embodiment, a base station performs power setting according to a pre-determined rule, the terminal does not need to be notified of the power setting, and the terminal may set power according to a set rule.

In another implementation manner of this embodiment of the present invention, it may be preset that, no data is transmitted in a control part of an extra RB, but only an empty RE is transmitted.

In specific implementation, REs in a data part and a control part of the extra RB may both transmit CRSs. In the control part of the extra RB, REs other than an RE that transmits a CRS and an RE that may be used for transmitting a CSI-RS RE and a DmRS are used for transmitting PDSCH data, and transmission energy of the RE for transmitting the CRS and the RE for transmitting the PDCCH is set to be the same as transmission energy of an RE in a normal RB. Specifically, energy for an RE in the data part of the extra RB transmitting a CRS may be set to be equal to energy for an RE in the normal RB transmitting a CRS. A ratio of energy for an RE in a symbol in the data part of the extra RB transmitting a PDSCH, where the symbol in the data part of the extra RB does not include a CRS, to energy for an RE transmitting a CRS may be set to be constant, and the ratio is $\rho_A$. A ratio of energy for an RE in a symbol in the data part of the extra RB transmitting a PDSCH, where the symbol in the data part of the extra RB includes a CRS, to the energy for the RE transmitting the CRS may be set to be constant, and the ratio is $\rho_B$. Energy for an RE in the control part of the extra RB transmitting a CRS may be set to be equal to the energy for the RE in the normal RB transmitting the CRS. A ratio of energy for an RE in a symbol in the control part of the extra RB transmitting a PDSCH, where the symbol in the control part of the extra RB does not include a CRS, to the energy for the RE transmitting the CRS may be set to be constant, and the ratio is $\rho_A$. A ratio of energy for an RE in a symbol in the control part of the extra RB transmitting a PDSCH, where the symbol in the control part of the extra RB includes a CRS, to the energy for the RE transmitting the CRS may be set to be constant, and the ratio is $\rho_B$. Energy for an RE in the extra RB transmitting a DmRS may be set to be equal to energy for an RE in the extra RB transmitting a PDSCH.

In another application of this embodiment of the present invention, in the extra RB, no signal may be transmitted in an RE position where a CRS is originally transmitted, but PDSCH data or other signaling is transmitted. The RE originally transmitting the CRS includes: an RE that transmits a CRS in a symbol that includes the CRS, and an empty RE that are stopped being sent in order to avoid CRS collision between different antennas when the number of antennas is greater than 1. In the extra RB, the RE that originally transmits the CRS in the symbol that includes the CRS may not transmit any signal. Specifically, in the extra RB, energy for each RE in a control part transmitting a PDSCH is equal, and energy for each RE in a data part transmitting a PDSCH is equal; or a solution of allocating energy for transmitting PDSCH data in the extra RB is the same as a power allocation manner of a LTE system, that is, a ratio of energy for an RE in a symbol transmitting a PDSCH, where the symbol does not include a CRS, to energy for an RE in a symbol transmitting a CRS, where the symbol includes a CRS, is $\rho_A/\rho_B$; or transmission energy that is originally used for transmitting a CRS in the extra RB is used for transmitting PDSCH data. Transmission power that is originally used for transmitting the CRS in the extra RB is used for transmitting the PDSCH data, which specifically is: calculating a sum of energy for all REs in each symbol of the extra RB originally transmitting the CRS, and then allocating the energy to REs in the symbol for transmitting the PDSCH. In the extra RB, the RE that originally transmits the CRS in the symbol that includes the CRS transmits signaling, which includes: In the extra RB, the RE that originally transmits the CRS in the symbol that includes the CRS transmits signaling, where EPRE of the signaling may be set to be the same as EPRE of PDSCH data of the symbol; or a ratio of energy for each RE transmitting the signaling to energy for each RE in the symbol transmitting a PDSCH is constant. In the extra RB, the RE that originally transmits the CRS in the symbol that includes the CRS transmits a data signal, which includes: In the extra RB, the RE that originally transmits the CRS transmits data, energy for each RE in a control part transmitting a PDSCH is set to be the same, and energy for each RE in all data parts transmitting a PDSCH is set to be the same.

Figure 7:
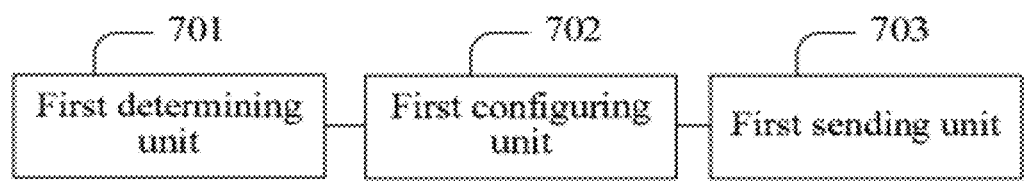
FIG. 7 is a schematic diagram of a device for resource configuration according to an embodiment of the present invention.

FIG. 7 is a schematic diagram of a device for resource configuration according to an embodiment of the present invention. The device includes: a first determining unit 701, adapted to determine an extra resource block existing in a wireless resource, where the extra resource block is a resource that cannot be identified by a long term evolution system; a first configuring unit 702, adapted to configure transmission power of a resource element in the extra resource block according to a power configuration rule; and a first sending unit 703, adapted to send a signal on the resource element in the extra resource block according to configured transmission power.

The device in this embodiment configures transmission power of an extra resource block that cannot be identified by a long term evolution system and sends data according to the configuration, so that a wireless resource that cannot be identified by the long term evolution system can also be effectively used, thus improving a resource utilization rate. In this embodiment, a common application form of the device is a base station (including a NodeB and an eNodeB). In a specific application, the device may further include: a notification sending unit, adapted to notify a terminal of the power configuration rule. The power configuration rule includes that, transmission power of a resource element in a data part of the extra resource block is less than or equal to transmission power of a resource element, for transmitting a common reference signal, in a normal resource block, and transmission power of a resource element in a control part of the extra resource block is less than or equal to the transmission power of the resource element, for transmitting the common reference signal, in the normal resource block, which are not detailed here again.

Figure 8:
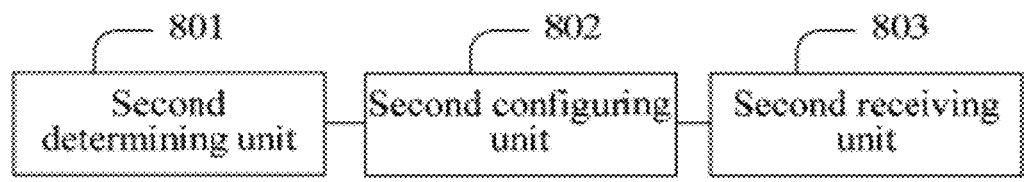
FIG. 8 is a schematic diagram of another device for resource configuration according to an embodiment of the present invention.

FIG. 8 is a schematic diagram of another device for resource configuration according to an embodiment of the present invention. The device includes: a second determining unit 801, adapted to determine an extra resource block existing in a wireless resource, where the extra resource block is a resource that cannot be identified by a long term evolution system; a second configuring unit 802, adapted to configure a receiving power relationship of a resource element in the extra resource block according to a power configuration rule; and a second receiving unit 803, adapted to receive a signal on the resource element in the extra resource block according to a configured receiving power relationship.

The device may configure power according to a rule pre-saved in the device and receive a signal transmitted in an extra resource block, so that information transmitted in an extra resource can be effectively received, thus improving a resource utilization rate. The device may also acquire a power configuration rule from a base station. Accordingly, the device may further include: a notification acquiring unit, adapted to acquire the power configuration rule. The power configuration rule includes that, transmission power of a resource element in a data part of the extra resource block is less than or equal to transmission power of a resource element, for transmitting a common reference signal, in a normal resource block, and transmission power of a resource element in a control part of the extra resource block is less than or equal to the transmission power of the resource element, for transmitting the common reference signal, in the normal resource block. In a specific application, the device is terminal equipment.

Through the preceding description of the embodiments, persons skilled in the art may clearly understand that the present invention may be implemented by software, and definitely may also be implemented by hardware. Based on this understanding, in the embodiments of the present invention, the technical solutions or the part that makes contributions to the prior art can be substantially embodied in the form of a software product. The software product may be stored in a storage medium, and include several instructions for enabling a mobile device (may be a mobile phone, a personal computer, or a media player) to perform the method described in each embodiment of the present invention. Here, the storage medium is, for example, an ROM/RAM, a magnetic disk, or an optical disk.

Apparently, various modifications and variations can be made by persons skilled in the art to the present invention without departing from the spirit and scope of the present invention. In this way, if these modifications and variations made to the present invention fall in the scope of the claims and equivalent technology of the present invention, the present invention is also intended to cover these modifications and variations.

What is claimed is:

1. A method for resource configuration, comprising:
   determining an extra resource block existing in a wireless resource, wherein the extra resource block is a resource that cannot be identified by a long term evolution system;
   configuring transmission power of a resource element in the extra resource block according to a power configuration rule; and
   sending a signal on the resource element in the extra resource block according to the configured transmission power.

2. The method according to claim 1, wherein the power configuration rule comprises that transmission power of a resource element in a data part of the extra resource block is less than or equal to transmission power of a resource element for transmitting a common reference signal in a normal resource block, and transmission power of a resource element in a control part of the extra resource block is less than or equal to the transmission power of the resource element for transmitting the common reference signal in the normal resource block.

3. The method according to claim 1, further comprising: notifying a terminal of the power configuration rule, which comprises:
   notifying the terminal of the following: an energy of a resource element for transmitting a reference signal in the data part of the extra resource block, or a ratio $\rho_C$ of the energy of the resource element for transmitting the reference signal in the data part of the extra resource block to an energy of the resource element for transmitting a common reference signal in a normal resource block, or a ratio $\rho_D$ of the energy of the resource element for transmitting the reference signal in the data part of the extra resource block to an energy of a resource element for transmitting a reference signal in the normal resource block; or notifying the terminal of the following: an energy of a resource element for transmitting a reference signal in the control part of the extra resource block, or a ratio $\rho_G$ of the energy of the resource element for transmitting the reference signal in the control part of the extra resource block to an energy of the resource element for transmitting a common reference signal in the normal resource block, or a ratio $\rho_H$ of the energy of the resource element for transmitting the reference signal in the control part of the extra resource block to an energy of a resource element for transmitting a reference signal in the normal resource block, or a ratio $\rho_I$ of the energy of the resource element for transmitting the reference signal in the control part of the extra resource block to the energy of a resource element for transmitting a reference signal in the data part of the extra resource block; or notifying the terminal of the following: a ratio $\rho_E$ of an energy of a first resource element in the data part of the extra resource block to the energy of the resource element for transmitting the reference signal in the data part of the extra resource block, or a ratio $\rho_F$ of an energy of a second resource element in the data part of the extra resource block to the energy of the resource element for transmitting the reference signal in the data part of the extra resource block, or a ratio $\rho_J$ of an energy of a first resource element in the control part of the extra resource block to the energy of the resource element for transmitting a reference signal in the control part of the extra resource block, or a ratio $\rho_K$ of an energy of a second resource element in the control part of the extra resource block to the energy of the resource element for transmitting the reference signal in the control part of the extra resource block; or notifying the terminal of the following: a ratio $\rho_L$ of the energy of the first resource element in the data part of the extra resource block to an energy of a first resource element in the normal resource block, or a ratio $\rho_M$ of the energy of the second resource element in the data part of the extra resource block to the energy of the first resource element in the data part of the extra resource block, or a ratio $\rho_N$ of the energy of the first resource element in the control part of the extra resource block to the energy of the first resource element in the data part of the extra resource block, or a ratio $\rho_O$ of the energy of the second resource element in the control part of the extra resource block to the energy of the first resource element in the data part of the extra resource block.

4. The method according to claim 3, wherein
for different cells, values of the ratios $\rho_C$, $\rho_D$, $\rho_E$, $\rho_F$, $\rho_G$, $\rho_H$, $\rho_I$, $\rho_J$, $\rho_K$, $\rho_L$, $\rho_M$, $\rho_N$, and $\rho_O$ are different, or
for different terminals, values of the ratios $\rho_C$, $\rho_D$, $\rho_E$, $\rho_F$, $\rho_G$, $\rho_H$, $\rho_I$, $\rho_J$, $\rho_K$, $\rho_L$, $\rho_M$, $\rho_N$, and $\rho_O$ are different, or
for different carriers in the same cell, values of the ratios $\rho_C$, $\rho_D$, $\rho_E$, $\rho_F$, $\rho_G$, $\rho_H$, $\rho_I$, $\rho_J$, $\rho_K$, $\rho_L$, $\rho_M$, $\rho_N$, and $\rho_O$ are different, or
for different carriers of the same terminal, values of the ratios $\rho_C$, $\rho_D$, $\rho_E$, $\rho_F$, $\rho_G$, $\rho_H$, $\rho_I$, $\rho_J$, $\rho_K$, $\rho_L$, $\rho_M$, $\rho_N$, and $\rho_O$ are different.

5. The method according to claim 3, wherein
for different cells, values of the ratios $\rho_E$, $\rho_F$, $\rho_J$, $\rho_K$, $\rho_M$, or $\rho_O$ are different, and
for different terminals, values of the ratios $\rho_C$, $\rho_D$, $\rho_G$, $\rho_H$, $\rho_I$, $\rho_L$, or $\rho_N$ are different.

6. A method for resource configuration, comprising:
determining an extra resource block existing in a wireless resource, wherein the extra resource block is a resource that cannot be identified by a long term evolution system;
configuring a receiving power relationship of a resource element in the extra resource block according to a power configuration rule; and
receiving a signal on the resource element in the extra resource block according to the configured receiving power relationship.

7. The method according to claim 6, wherein the power configuration rule comprises that transmission power of a resource element in a data part of the extra resource block is less than or equal to transmission power of a resource element for transmitting a common reference signal in a normal resource block, and transmission power of a resource element in a control part of the extra resource block is less than or equal to the transmission power of the resource element for transmitting the common reference signal in the normal resource block.

8. The method according to claim 6, further comprising:
acquiring the power configuration rule, which comprises:
    acquiring an energy of a resource element for transmitting a reference signal in a data part of the extra resource block, or a ratio $\rho_C$ of the energy of the resource element for transmitting the reference signal in the data part of the extra resource block to an energy of the resource element for transmitting a common reference signal in a normal resource block, or a ratio $\rho_D$ of the energy of the resource element for transmitting the reference signal in the data part of the extra resource block to an energy of a resource element for transmitting a reference signal in the normal resource block; or
    acquiring energy of a resource element for transmitting a reference signal in the control part of the extra resource block, or a ratio $\rho_G$ of the energy of the resource element for transmitting the reference signal in the control part of the extra resource block to the energy of the resource element for transmitting the common reference signal in the normal resource block, or a ratio $\rho_H$ of the energy of the resource element for transmitting the reference signal in the control part of the extra resource block to the energy of the resource element for transmitting the reference signal in the normal resource block, or a ratio $\rho_I$ of the energy of the resource element for transmitting the reference signal in the control part of the extra resource block to the energy of the resource element for transmitting the reference signal in the data part of the extra resource block; or
    acquiring a ratio $\rho_E$ of an energy of a first resource element in the data part of the extra resource block to the energy of the resource element for transmitting the reference signal in the data part of the extra resource block, or a ratio $\rho_F$ of an energy of a second resource element in the data part of the extra resource block to the energy of the resource element for transmitting the reference signal in the data part of the extra resource block, or a ratio $\rho_J$ of an energy of a first resource element in the control part of the extra resource block to the energy of the resource element for transmitting the reference signal in the control part of the extra resource block, or a ratio $\rho_K$ of an energy of a second resource element in the control part of the extra resource block to the energy of the resource element for transmitting the reference signal in the control part of the extra resource block; or acquiring a ratio $\rho_M$ of energy of the second resource element in the data part of the extra resource block to the energy of the first resource element in the data part of the extra resource block, or a ratio $\rho_N$ of energy of the first resource element in the control part of the extra resource block to the energy of the first resource element in the data part of the extra resource block, or a ratio $\rho_O$ of the energy of the second resource element in the control part of the extra resource block to the energy of the first resource element in the data part of the extra resource block.

9. A device for resource configuration, comprising:

a determining unit, adapted to determine an extra resource block existing in a wireless resource, wherein the extra resource block is a resource that cannot be identified by a long term evolution system;

a configuring unit, adapted to configure transmission power of a resource element in the extra resource block according to a power configuration rule; and a sending unit, adapted to send a signal on the resource element in the extra resource block according to the configured transmission power.

10. The device according to claim 9, further comprising:

a notification sending unit, adapted to notify a terminal of the power configuration rule.

11. A device for resource configuration, comprising:

a determining unit, adapted to determine an extra resource block existing in a wireless resource, wherein the extra resource block is a resource that cannot be identified by a long term evolution system;

a configuring unit, adapted to configure a receiving power relationship of a resource element in the extra resource block according to a power configuration rule; and a receiving unit, adapted to receive a signal on the resource element in the extra resource block according to the configured receiving power relationship.

12. The device according to claim 11, further comprising:

a notification acquiring unit, adapted to acquire the power configuration rule.

* * * * *